Figure 1:
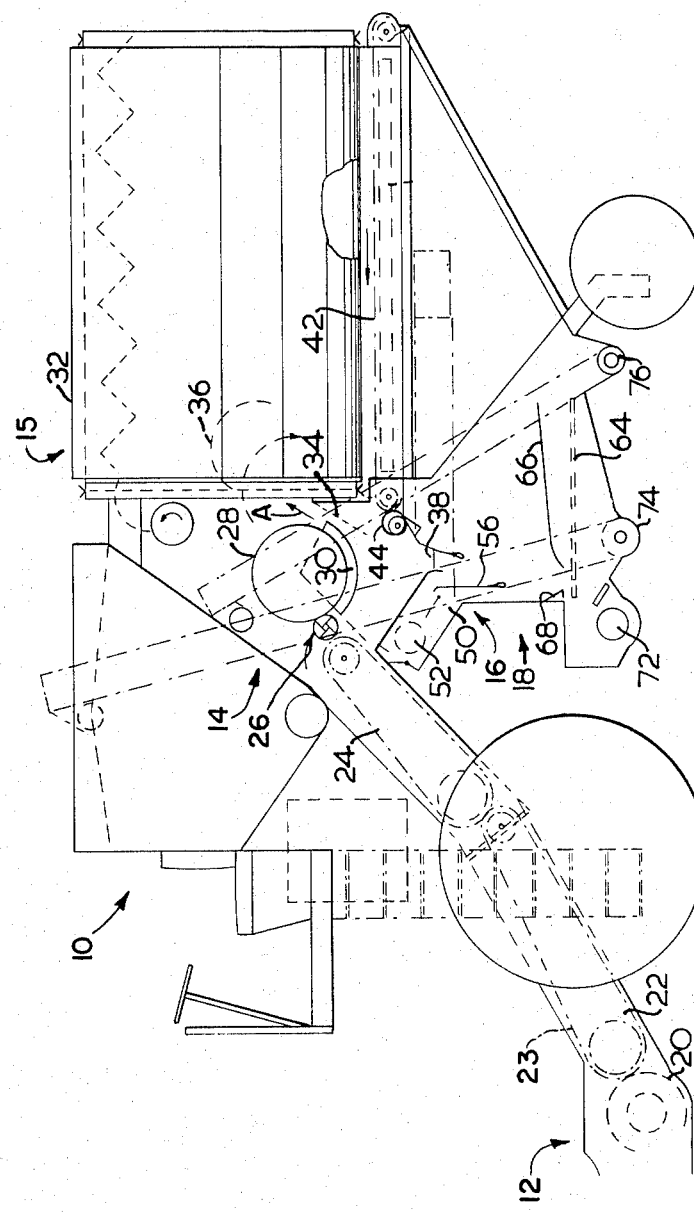

United States Patent [19]
Reed et al.

[11] 3,797,502
[45] Mar. 19, 1974

[54] PNEUMATIC CLASSIFIER FOR ROTARY THRESHING MACHINE

[75] Inventors: William B. Reed; Floyd W. Bigsby, both of Saskatchewan, Canada

[73] Assignee: Western Roto Thresh Ltd., North Saskatoon Saskatchewan, Canada

[22] Filed: Mar. 9, 1972

[21] Appl. No.: 233,259

[30] Foreign Application Priority Data
Mar. 2, 1972   Canada .............................. 136064

[52] U.S. Cl. ............................ 130/27 R, 130/27 Z
[51] Int. Cl. ........................................... A01f 12/24
[58] Field of Search ...... 130/24, 27 R, 27 F, 27 HF, 130/27 T, 27 Z; 209/136, 137, 283, 284, 297, 33

[56] References Cited
UNITED STATES PATENTS
2,612,742   10/1952   Heth ................................. 130/27 R
1,884,114   10/1932   Moroney .............................. 130/24
1,917,536   7/1933    McIntire .............................. 130/24
3,391,523   7/1968    McBain et al. ..................... 130/27 R FOREIGN PATENTS OR APPLICATIONS
247,689   11/1969   U.S.S.R. ......................... 130/27 HF Primary Examiner—Antonio F. Guida
Attorney, Agent, or Firm—Stevens, Davis, Miller & Mosher

[57]    ABSTRACT

A pneumatic two-stage aspirator is provided for threshing machines to remove material other than grain from grain. The aspirator is placed below the concave of the threshing cylinder and a fan and baffle means create two levels of air suspension below the concave and through which the grain and chaff must fall. The material other than grain that is not removed in the first or upper level of air suspension is subjected to a further pneumatic suspension at the lower or second level.

4 Claims, 2 Drawing Figures

PNEUMATIC CLASSIFIER FOR ROTARY THRESHING MACHINE

This invention relates to devices for separating grain from material other than grain and in particular to an improved aspirator grain separating device over that disclosed in our copending application Ser. No. 222,084, filed Jan. 31, 1972, now abandoned.

The present invention is not limited to use in a specific type of combine but preferably it is adapted to form part of a rotary type combine such as that shown in application or in Canadian Pat. Ser. No. 222,084, filed Jan. 31, 1972 No. 802,635 of Dec. 31, 1968.

Conventional agricultural combine harvesters utilize "straw walkers" and separate grain and chaff by passing the mixture over a vibrating sieve. Separation is achieved by forcing a stream of air upwardly through the sieve so that the lighter material tends to float on top of the sieve while the heavier seeds or grain tend to fall through the sieve. Successful operation of these prior art devices depend on proper sieve opening and air flow rates for the crop and feed rate. In addition, the feed must be uniformly distributed in the sieve and the air flow through the sieve must be uniformly distributed.

One of the main problems with the prior art devices is that uniform air distribution is difficult to achieve over the large sieve area required in a modern high capacity combine. Uniformity of distribution of material over the sieve depends on the performance of the conveying mechanism which must be used to carry the material from the threshing cylinder to the sieve.

Moreover, the rearward component of air in known machines creates a force on grain kernels as well as chaff particles and thus a rearward velocity to kernels of grain. If the kernels do not fall through the sieve almost immediately, they will gain sufficient velocity to be carried out of the machine. This situation occurs when there is a large amount of chaff on the sieve which impedes passage therethrough.

Copending Application No. 222,084 provides means for curing numerous problems of prior art machines by providing an air classification system or aspirator which places the chaff in momentary air suspension to remove the material other than grain (or M. O. G.) from the grain itself. The aspirator unit can be placed directly below the concave of a threshing cylinder so that it is not necessary to transport material prior to separating.

In the aspirator separator where grain and chaff are allowed to fall by gravity through a region of relatively still air, particles of grain and chaff are acted upon by two forces, the gravitational force equal to the weight of the particle and the drag force of the air which opposes the motion. The drag force is a function of the velocity and increases as the velocity increases. From the laws of motion the acceleration of a particle under these conditions is given by:

1.

$W - d = Wa/g$ $W$ = particle weight
$d$ = drag force
$a$ = *acceleration of the particle*
$g$ = accleration of gravity Rearranging Equation 1 gives:

$$a = g(W-d)/W$$

or 2.

$$a = g[1 - (d/W)]$$

The acceleration of a particle falling in a fluid thus depends on the factor $d/W$ or the ratio of drag force to weight. Light chaff particles have a much larger ratio $d/W$ than do kernels of grain. The kernels will achieve a much higher velocity than the chaff particles. This difference in velocity is important to the operation of the separator, as will be shown later. The particles of chaff and kernels fall into a counter current region, where they encounter a flow of air substantially opposite to their direction of motion.

The counter flow of air increases the drag force. The drag force on the chaff becomes greater than the weight causing the acceleration to become negative. The distance through which a particle of chaff travels before its direction reverses is determined by the ratio of drag force to weight and the velocity of the chaff when it enters the counter flow section. With a ratio of drag force to weight much greater than one and a low initial velocity, the chaff will travel only a short distance before it reverses direction and travels with the air out of the separator.

The effect of the counter flow of air on the grain kernels is similar but much less. As can be seen from Equation (2), when the drag force is equal to the weight the acceleration is equal to zero and the particle continues with a constant velocity downward. If the drag force is greater than the weight, the kernel travels downward a distance depending on the magnitude of the drag force and the initial velocity. Because of the greater initial velocity of the kernels when they enter the separating region, it is possible to have a ratio of drag force to weight for the kernels greater than one and still have the kernels pass through the separating region before their velocity is reduced to zero.

When the air velocity is great enough for the ratio of drag force to weight for kernels to be equal to one the corresponding ratio for the chaff is much greater than one. This makes for a high degree of selection between chaff and kernels so that the device is a very efficient separator.

The present invention discloses a two-stage aspirator similar in principal to the single-stage version of Application 222,084. The function of the second stage is to provide additional capacity to the aspirator. At higher feed rates, the single-stage may be limited to the percentage of chaff it can remove. This is due to some the chaff being carried by or with the grain kernels. In accordance with the structure of the present invention, the grain and chaff drop downwardly by gravity both from the concave and from the conveyor through a throat area and thence through two stages of separation. In the distance from the first to second stages, the grain and chaff rotate or tumble and thereby free the chaff clinging or caught by the grain kernels. Separation can then take place at the second stage in the same manner that the first stage.

According to a broad aspect, the present invention relates to an aspirator grain separator for use in a combine having a threshing cylinder and a concave and comprises a structure providing a vertically oriented throat disposed below the concave for passage of grain and chaff therethrough and a two-level pneumatic separation area including a channel disposed adjacent to and below said throat; fan means at one terminal end of said channel for providing an air therein, said air flow being angularly disposed with respect to the vertical direction of said throat; and baffle means in said channel to provide a first upper air passage immediately below and across said throat and a second lower passage below said first passage whereby grain and chaff falling downwardly through said throat are subjected to two substantially counter flows of air for classification.

Figure 2:
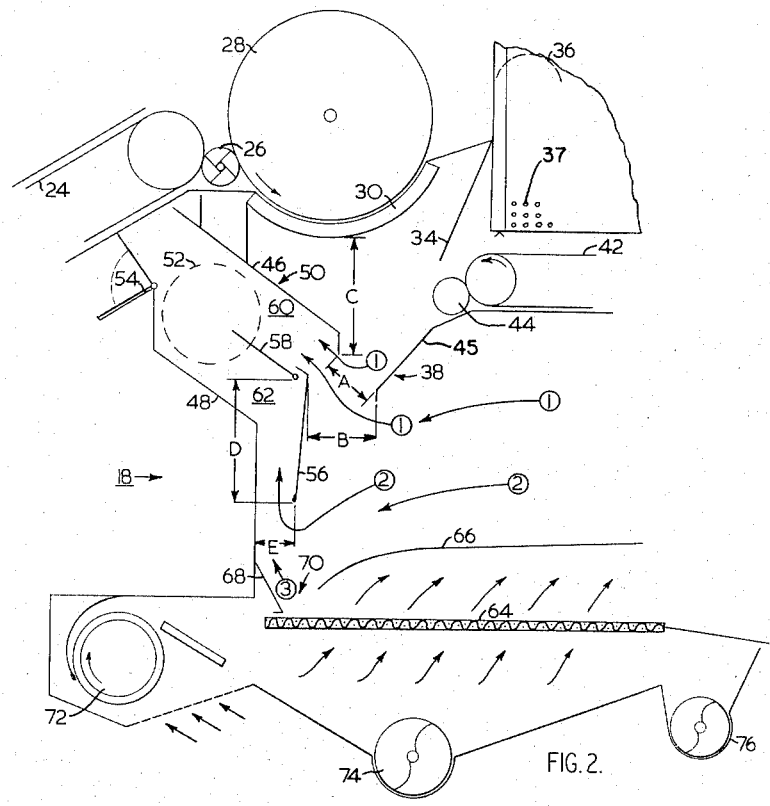

The invention will now be described with reference to the accompanying drawings in which:

FIG. 1 is a side elevation which schematically illustrates the arrangement of the present invention within a rotary type of combine; and FIG. 2 is a schematic cross-sectional view of the two-stage aspirator in accordance with the present invention.

Referring to FIG. 1, the combine harvester 10 includes a table section 12, a threshing section 14, a separating section 15, a classifying section 16 and a cleaning section 18.

In accordance with normal combine construction, the table section 12 includes a table auger 20 which when rotating moves the material for threshing towards the center of a primary feed 22 constituted by a chain conveyor 23. The primary feed 22 conveys the material to be threshed to a secondary feed 24 and thence to a combination spreader and feeder 26 which spreads the material across the face of the threshing cylinder 28 whereby the material is more evenly feed to the nip of the concave 30.

The threshing operation imparts a high velocity to the threshed material and the threaded material is both deflected upwardly in the direction of arrow A to enter the forward end of the rotary deck 32 through the guidance of a deflector plate 34 and eyebrow 36 which serves to divert the threshed material downwardly on to the floor of the deck 32. Some grain is immediately separated from the straw and chaff in the concave 30 and this grain drops downwardly into the throat 38 of the classifying section 16.

The threshed material is rotated within the drum 32 where the grain and chaff are forced through openings 37 (FIG. 2) in the drum surface and are thereafter deposited on a conveyor 42 which serves to carry the grain forwardly to the throat area. A stripping auger or the like 44 may be utilized to distribute grain and material other than grain into the throat area from the terminal end of the conveyor 42. Any straw, weed stalks and the like remaining in the drum 32 are carried outwardly through the rear opening thereof by the centrifugal action of the drum and possibly assisted by the exhaust of the aspirator fan to be described hereinafter.

Referring to FIG. 2, the classifying section is shown schematically in cross section and consists of a plurality of panel members formed to provide the various air passages and partitions. Throat 38 is defined by a panel 45 extending below the conveyor 42 and terminating in a downward extension, and panel 46 extending downwardly at an angle from the upper end of the feed conveyor 24 so that panels 46 and 45 define a funnel like arrangement beneath the concave 30 whereby the grain and M.O.G. is directed through the throat 38.

The outer casing or panel 48 together with panel 46 forms a channel 50 having an aspirator fan and air outlet 52 adjacent the upper end thereof. A hinged flap or door 54 at the upper terminal end of channel 50 provides means for adjusting the air flow which passes through the aspirator 52 and a downwardly extending partition 56 and a hinged adjustable baffle 58 act together to divide the panel 50 into upper and lower air passages 60 and 62 respectively.

The lower end of the assembly comprises a cleaning sieve 64 partially enclosed on its upper surface by a shroud 66 and a baffle 68 which together form a small opening 70 at one end of the sieve. A suitable flow fan 72 provides air flow in the direction of the indicating arrows to remove the final amounts of chaff and straw from the grain which is allowed to fall down through the sieve and into the clean grain auger 74. The remaining unthreshed heads and any grain not passing through the sieve is passed into a tailing auger 76 and subsequently returned for rethreshing.

In operation, the grain and M.O.G. from the threshing cylinder and concave attain a certain downwardly velocity in leaving from both the concave and from the conveyor 42 into and through the throat 38 where the mixture is met by a substantially counter air flow, indicated by arrows 1, and which is directed through the upper passage 60 of the channel 50 to the air outlet 52. A high percentage of the chaff is removed on this first stage while the heavier grain material continues to fall downwardly until it meets the second counter air flow stage indicated by arrows 2. The higher downward velocity of the grain kernels permit them to escape from the two counter flows of air and to continue falling downwardly towards the cleaning sieves 64. The chaff and straw having not attained a high enough velocity to escape have their direction of travel changed and are carried out with either the first or second air stage through the lower passage 62 of the channel 50. The provision of the two stages of pneumatic separation permits a greater percentage of the chaff and straws to be removed before the grain reaches the cleaning sieve. Finally, there is a small amount of pneumatic separation derived from the flow fan 72 as indicated by arrow 3 before the grain finally reaches the sieve 64.

It will be appreciated that by means of the hinged flap 54 at the terminal end of the channel 50 and by means of the movable flap or baffle 58 separating the two channels 60 and 62, a desired balance of air flow of the two stages can be obtained. In actual practice with a prototype model of the present invention, it has been found that a throat width indicated at A is between 3 and 12 inches with the opening between the terminal end of panel 44 and baffle 56 indicated at B is also between 3 and 12 inches. The distance between the first and second stages or mouths of the passages 60 and 62 is indicated at B may be from 4 to 30 inches and the width of the mouth of the lower passage 62 indicated at E may be from 2 to 10 inches. It will be appreciated that the above measurements are not restrictive but have been shown to provide good results in a prototype.

The advantages of a two-stage aspirator over the normal type of threshing operation are many. The major portion of the chaff is separated without the use of a vibrating sieve and the chaff is drawn out of the stream into the aspirator and closed conductor so that its movement after separation can be controlled. The performance is relatively unaffected by feed rate and distribution so that a wide range of conditions can be accommodated without the need for adjustment.

Further, a variety of crops can be harvested with altering the adjustment of the device. Wheat, oats and barley have been successfully harvested at the same setting and the removal of the major portion of the chaff in the present invention makes the subsequent removal of unthreshed heads from the grain much more efficient. Lastly, the construction of the invention is relatively simple requiring a relatively small number of moving parts.

The embodiments of the invention in which an exclusive property or privilege is claimed are defined as follows:

1. In a combine having a threshing cylinder and concave, an aspirator grain separator for pneumatically separating chaff from grain comprising panel means formed to define paths of travel for said grain and chaff between the area adjacent the concave downwardly to a cleaning sieve in the lower end of said separator; said panels providing
   a. a vertically oriented throat of funnel-like cross-section disposed below said concave for concentration and passage of threshed grain and chaff therethrough;
   b. a first pneumatic low pressure separation area adjacent the exit of said throat, including fan means spaced from the area adjacent the throat and a first air channel interconnecting the area and the fan whereby operation thereof draws air into the first channel to creat said first low pressure area;
   c. a passageway onto said cleaning sieve;
   d. and a second air channel to said fan means terminating intermediate said first channel and the sieve passageway to provide a second pneumatic low pressure area for drawing chaff from grain falling from the throat into the sieve passageway.

2. A grain separator according to claim 1 wherein said first air channel is disposed angularly upwardly with respect to the exit of the throat whereby the first air channel provides an extractor current across and upwards relative to the path of falling grain and chaff.

3. A grain separator according to claim 1 including an adjustable baffle adjacent the fan means for adjusting the velocity of air in the first and second channels.

4. A separator according to claim 1 wherein said second air channel is substantialy parallel to the path of chaff and grain falling from said throat whereby the air flow of the second air channel extends across and vertically upwards relative to the passage of chaff and grain falling from the throat.

* * * * *